No. 670,697. Patented Mar. 26, 1901.
F. BEDELL.
SYSTEM OF TELEGRAPHY.
(Application filed Oct. 20, 1899.)
(No Model.)
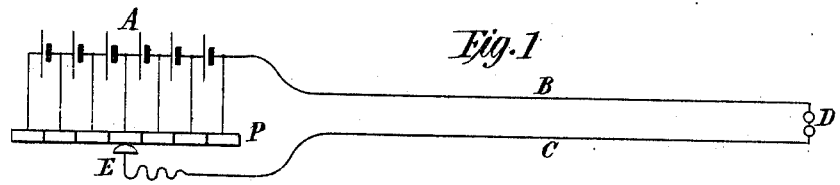
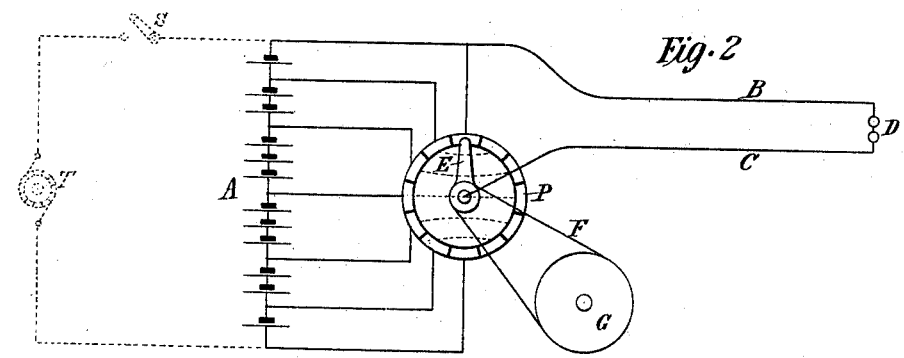
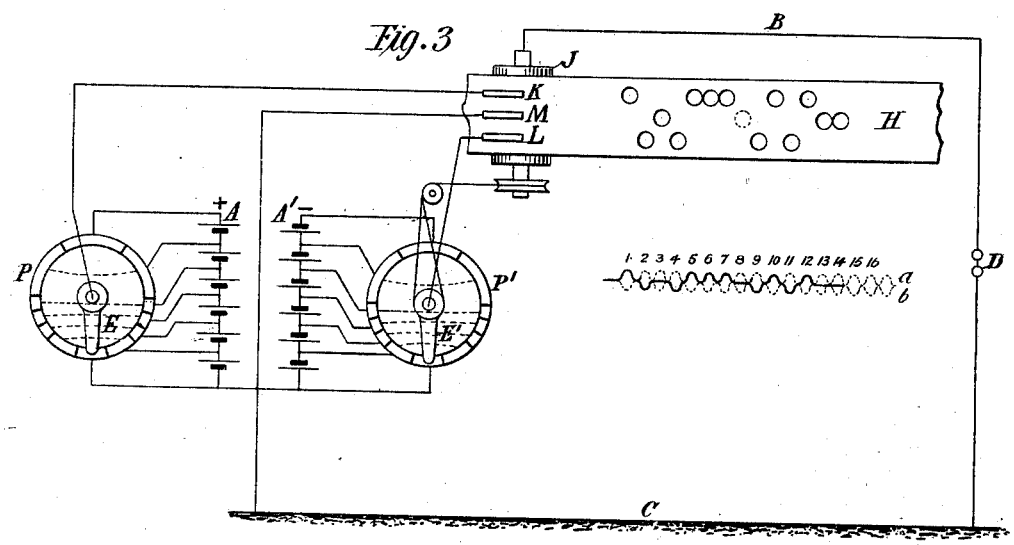
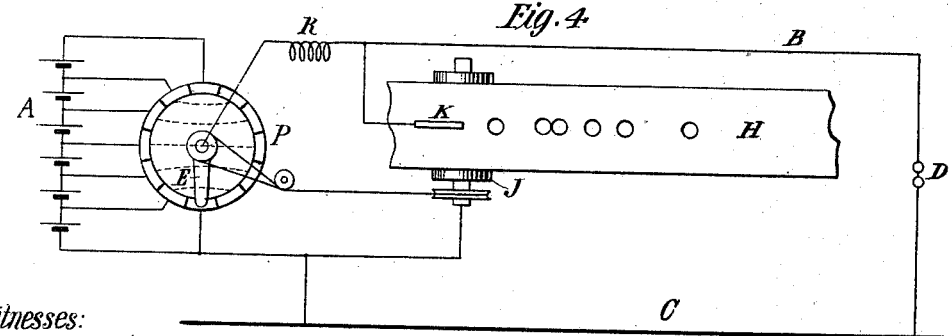
Witnesses:
Raphael Netter
L. J. Shaw
Inventor
Frederick Bedell
by E. M. Bentley Att'y

UNITED STATES PATENT OFFICE.

FREDERICK BEDELL, OF ITHACA, NEW YORK.

SYSTEM OF TELEGRAPHY.

SPECIFICATION forming part of Letters Patent No. 670,697, dated March 26, 1901.

Application filed October 20, 1899. Serial No. 734,172. (No model.)

*To all whom it may concern:*

Be it known that I, FREDERICK BEDELL, a citizen of the United States, residing at Ithaca, county of Tompkins, and State of New York, have invented certain new and useful Improvements in Systems of Telegraphy, of which the following is a specification, reference being made to the accompanying drawings, wherein—

Figures 1 and 2 represent forms of apparatus which may be employed in carrying out my invention, and Figs. 3 and 4 illustrate applications of my invention to a telegraph or cable system.

My invention relates to the transmission of impulses of current over any telegraphic circuit, land-line, or submarine cable, the impulses being selected and combined in a predetermined manner for the transmission of messages according to a specified code. It likewise relates to the employment of a plurality of sources of electromotive force in a telegraphic system and affords means for inserting and withdrawing the several sources into and out from the circuit.

It relates, further, to a system of telegraphy wherein the line or cable is grounded or short-circuited between impulses, groups of impulses, letters, or words, or at any desired interval.

In the art of telegraphy it has heretofore been common to employ a single source of electromotive force or two sources of opposite polarity. It has likewise been common to open and close the circuit in the code transmission of impulses and to leave the line on open circuit between letters, words, and groups of impulses. It has also been common to provide means for grounding a line or cable between code impulses. In signaling over land-lines or cable it has not been attempted, so far as I am aware, to employ a plurality of sources of electromotive force nor to ground or short-circuit the line or cable at moments of zero potential difference between the line and ground. I provide in my system any desirable sources of direct electromotive force and derive therefrom a series of direct-current impulses gradually rising from and falling to zero by including and excluding in any desired cyclic order the several sources of electromotive force, so that the circuit may be closed, opened, short-circuited, or grounded at the zero-point between successive impulses, thereby avoiding the undesirable reactive effects from the line or cable which would accompany the sudden insertion or removal of the entire maximum electromotive force. I also provide means whereby the several electromotive forces inserted into and withdrawn from the circuit may have the same or different values, and the time between their successive inclusions and exclusions may severally be given any desired values. In this manner the cyclic increase and decrease of the total electromotive force included in the circuit may be varied as desired; but the fineness of gradation is limited by the smallest element of electromotive force employed.

My invention further comprises a system of telegraphing wherein the line or cable may be short-circuited or grounded between impulses or groups of impulses, the ground connection being made at moments of zero-potential difference between the line and ground, by which means opportunity is given for the line or cable to become discharged without reactive disturbances, thus making it possible to transmit impulses in more rapid succession without interference. In my system the potential of the line or cable increases to a maximum value and gradually decreases therefrom to a value equal to the potential of the line or return circuit, and it is at this moment of zero-potential difference between the line and return circuit, approached in this gradual manner, that I ground or short-circuit the line. These features of my invention are shown but not claimed in my prior application for patent on a telegraph system, Serial No. 717,736, filed May 22, 1899. In the use of submarine cables, to which this improvement more particularly relates, but without being limited thereto, the speed of transmission is in many cases seriously limited by the time taken for the cable to discharge, and this limitation has been only partially removed by grounding at moments when the cable is not at zero potential. It may be observed that when the entire battery is suddenly disconnected from a cable the charge of a cable tends to maintain the potential of the cable. My system provides means for gradually bringing the cable to zero potential, when it may be grounded with no disturbing effect.

Referring to Fig. 1 of the drawings, let A represent a battery of primary or secondary cells or any other convenient sources of direct electromotive force from which current is to be transmitted over a circuit formed by the line-wires B and C to act upon a receiving apparatus D. A series of contact-plates P is connected to A, as shown, a separate source of electromotive force being connected between successive plates. If the movable contact E is caused to reciprocate back and forth over the series of plates P, it is evident that a succession of current impulses will be transmitted over the circuit corresponding to the movement of the contact E and the variation in number of cells included in the circuit. Obviously if the plates P are equal and include equal electromotive forces and the contact E moves back and forth with uniform speed the electromotive force will rise and fall in the circuit at a constant rate. It is likewise obvious that this rate of rise and fall of electromotive force may be varied by constructing the contact-plates of varying lengths, including between successive contact-plates electromotive forces of unequal value, or by causing the contact E to move with other than uniform speed.

In Fig. 2 is shown the same arrangement as shown in Fig. 1, except that the contact E is given a rotary instead of a reciprocating motion. The battery A, either primary or secondary, is arranged, as shown, with a different number of cells in the several groups included between successive contact-plates, for the purpose, already mentioned, of obtaining preferred increments and decrements in electromotive force as the contact E moves from plate to plate. It will be noted that corresponding plates on the right-hand half and the left-hand half of the circularly-arranged series are connected together.

When the battery A consists of secondary cells, these may be charged from the source of current T by closing the switch S in the conducting-wires connecting A with T, as shown by dotted lines. The switch S may be either open or closed during the normal operation of the apparatus for telegraphic purposes.

Fig. 3 shows an application of my invention to a telegraphic system, in which A and A' are sources of direct electromotive forces of opposite polarity, cyclically included and excluded by the synchronously-rotating contacts E and E', giving rise to current impulses, which by means of the brushes K and L, making contact with the conducting-cylinder J through perforations in the tape H, are transmitted over the line or cable B, through the receiving apparatus D, to the return-conductor or ground C. The revolving contacts E and E' may be operated from a common shaft, may be geared together, or synchronously driven in any desired manner. The several contact-plates in the series P and P' are constructed of varying length, as already described, for varying the time intervals between the successive inclusion and exclusion of the several groups of cells constituting the sources of electromotive forces A and A'. The operation of this embodiment of my invention is as follows: The potential of the brushes K and L periodically rises from and falls to zero, the rise and fall of potential of K and L being synchronous and preferably with coincident zero-points and of opposite polarity. The insulating-tape H, which normally prevents contact between K and L and the cylinder J, is caused to travel at a speed dependent upon the speed of rotation of the contacts E and E'.

In Fig. 3 the cylinder J is diagrammatically shown to be connected by pulley and belt or chain with the shaft from which E and E' are driven. I may, however, operate the cylinder J or other synchronous transmitter through a series of gears connected with the rotating contacts E E' or other apparatus for setting up current impulses. I prefer to connect the synchronous transmitter to its shaft by a clutch, whereby the transmitter may be disconnected and connected again in the proper phase of synchronous rotation.

Code perforations in the tape H serve to select the impulses to be transmitted, and as they pass beneath the brushes permit K or L to make contact with the cylinder J, whereby either a positive or a negative impulse is transmitted over the line B to the receiver D. The perforation in the tape H and the spaces between them are given such dimensions that the time taken in passing beneath the brushes K and L is equal to or some multiple of the time of one impulse of electromotive force obtained from A and A' by the rotation of E and E'. It therefore follows that contact between the brushes and the cylinder J is always made or broken at the zero-point between impulses. The dotted lines in the diagram accompanying Fig. 3 (sections 13 14 15 16) show the rise and fall of potential at the brushes K and L, respectively. The actual transmission of selected impulses according to code requirements is obtained by means of the perforations passing under the brushes K and L and is indicated by the solid lines, thus positive impulses (a) 1 5 6 7 10 12 are transmitted from the brush K through the corresponding perforations. In a like manner negative impulses (b) 2 4 9 11 are transmitted from the brush L. Assigning a dot as the code significance of a positive impulse and a dash as the significance of a negative impulse, the above series of transmitted impulses, as shown by solid lines in Fig. 3, (a) and (b,) correspond to the letters "a b c" in the Morse code.

In applying my invention the sources of electromotive force A and A' may be equal or different in value. Although I commonly prefer to have the sources of electromotive force of equal value and of opposite polarity, my invention may employ two sources of electromotive force A and A' of the same polarity and of different value. Thus the total electromotive force of the battery A may be half the total electromotive force of the battery A', thus giving rise to impulses of two amplitudes which may be employed as code elements, impulses from A being the equivalent of a dot and those from A' being the equivalent of a dash, as already described.

In addition to the apparatus thus far described, the operation of which is sufficient for the transmission of code messages, as just explained, the third brush M, Fig. 3, connected to the return-circuit or ground C, may be employed, as will be explained, to ground or short-circuit the line at desired intervals. Between the impulses 1 2, corresponding to the letter "a," and impulses 4 5 6 7, corresponding to the letter "b," the space 3 occurs. If there were no perforation in the tape for this interval, the line B would be open-circuited; but the perforation actually shown passes under the brush M and connects M to the cylinder J and line B, thereby short-circuiting or grounding the line, which at that time is at zero potential and giving it opportunity to discharge for the reasons already explained. The ground connection is maintained throughout the space interval and is broken at the zero-point between electromotive force impulses at a moment when all the cells in batteries A and A' are cut out. In a like manner the line may be grounded during all the space intervals 3 8 13 14 by the corresponding perforations passing under the brush M, or certain perforations, as 8, (shown by dotted lines,) may be omitted and the line grounded, therefore, only at preferred intervals—as, for example, between two or more letters, between words, or as otherwise desired.

It will be understood that although I commonly prefer a perforated tape as a circuit closing and opening device I do not limit myself thereto, but may employ any circuit-controller adapted to open and close the circuit at such times as may be necessary for the code requirements or for the grounding of the line, as described. Furthermore, I may employ any suitable source of rising and falling circuit impulses—such, for example, as would be obtained from the generating apparatus shown in my prior application for patent on a telegraph system, Serial No. 722,942, filed July 6, 1899.

A modification of my invention is shown in Fig. 4, wherein the battery A is connected to contact-plates P, which are traversed by contact E, connected through the resistance R to the line B, over which current impulses are transmitted through the receiver D and the return-circuit or ground C. In this modification of my invention the short-circuiting or grounding device consists of the brush K, which makes contact with the cylinder J through perforations in the insulating-tape H. While a perforation is passing beneath the brush K the line B is grounded or short-circuited by connection with C and is allowed to discharge, as already explained. As a perforation passes out from beneath K the potential of the line rises and falls as the contact E includes in the circuit a greater or lesser number of cells, and one or more impulses are transmitted, according to code requirements, to the receiver D until subsequent perforations pass beneath the brush K, whereupon the line is again grounded and transmits no impulses. At such times the resistance R prevents the short-circuiting of the battery A. Any preferred code may be employed for the transmission of messages. Thus a single impulse or an impulse of given value may represent a dot and two successive impulses or a single impulse of different value may represent a dash, permitting the employment of the Morse code.

As explained in connection with Fig. 3, the perforations and spaces in the tape H and its speed of travel are so adjusted that perforations pass under and leave the brush K at the zero-point between impulses. The line is consequently at zero potential when the ground connection is made.

It will be understood that I do not limit myself to the precise apparatus shown for including and excluding the several sources of electromotive force and for grounding or short-circuiting the line, but may adopt modifications thereof embodying the same general principles without departing from the spirit of my invention.

What I claim as new, and desire to secure by Letters Patent, is—

1. A system of telegraphy comprising in combination a series of sources of sustained electromotive force, one point of said series being connected to one terminal of the circuit, means for connecting the other terminal of the circuit to the said series so as to include without reversal a periodically increasing and decreasing number of said sources to produce periodic impulses of electromotive force and a transmitter adapted to apply to a line certain determined ones of said impulses according to a prearranged code and thus transmit over the line-circuit to a receiver connected thereto corresponding current impulses.

2. In a telegraph system the combination with a set of battery-cells connected in series to one terminal of a telegraph-line, of a series of contact-plates connected respectively to points between the several cells, a contact-brush connected to the opposite line-terminal and moving constantly over said plates and a selective transmitter grounding or short-circuiting at code-determined times the said line at moments of zero-potential difference between the line and return circuit.

3. The combination with an electric circuit, a telegraphic receiver connected thereto, and a source of sustained direct electromotive force, of means for applying such electromotive force in two differing series of rising and falling impulses and a transmitter operated synchronously with the said impulses and adapted to transmit the current impulses derived from either series of electromotive impulses over the circuit to the receiver in accordance with a prearranged code.

4. The combination with an electric circuit, a telegraphic receiver connected thereto and a source of sustained direct electromotive force, of means for deriving from such electromotive force two differing series of impulses of electromotive force rising and falling in value, said two series having coincident zero-points and a perforated tape traveling between circuit-closing terminals for impressing upon the circuit code-determined impulses of electromotive force of either series.

5. The combination with a line conductor of two branch generating-circuits, each containing a source of sustained electromotive force and means for deriving therefrom simultaneous and unidirectional impulses of electromotive force of rising and falling value, the impulses in one branch being opposite in direction to those in the other branch, and a circuit-closer for connecting either of said generating branch circuits to the return-conductor of the said line.

6. In a telegraph system comprising a line-circuit, a branch circuit to ground at the sending end and a receiver connected to ground at a distant point, the combination of one or more branch generating-circuits, each having produced therein a cyclic series of impulses of electromotive force of one polarity, means for partially or wholly discharging the line by gradually bringing the line to the same potential as the return-circuit, and a circuit-controller adapted to connect and disconnect the line with ground, consisting of a perforated tape traveling between circuit-closing terminals for closing the branch circuit to ground at moments of zero-potential difference between the line and the ground, and opening the same at moments of zero electromotive force in the branch generating-circuits.

7. The combination with an electric circuit and a receiving apparatus connected thereto, of a source of gradually rising and falling current impulses, a selective transmitter adapted to transmit code-determined current impulses over said circuit, and means for gradually bringing the line to the same potential as the return-circuit and for short-circuiting or grounding the circuit at moments of zero-potential difference between the line and return circuit.

8. The combination with an electric circuit and a receiver connected thereto, of a source of sustained direct electromotive force, means for deriving therefrom rising and falling current impulses, a perforated tape traveling between circuit-closing terminals and adapted to transmit code-determined impulses over said circuit and also to short-circuit or ground the circuit at moments of zero-potential difference between the line and return circuit.

9. The combination with a source of sustained direct electromotive force, of means for deriving therefrom rising and falling current impulses and for transmitting code-determined impulses over a line-circuit to suitable receiving apparatus, and means for short-circuiting or grounding the circuit at moments of zero-potential difference between the line and return circuit.

10. A telegraph system comprising in combination a source of electromotive force, means for deriving therefrom rising and falling current impulses and for transmitting said impulses to a receiver over a line-circuit the potential of which gradually increases to and decreases from its maximum value, a conductor connected to the ground or return circuit, and means for connecting the line-circuit to said conductor at moments of small or substantially zero-potential difference between the line and return circuit, said moments being subsequent to said gradual decrease in the line potential from its maximum value.

11. A telegraph system comprising in combination a source of electromotive force, means for deriving therefrom rising and falling current impulses and for transmitting said impulses to a receiver at a distant point, a line-circuit the potential of which gradually increases to and decreases from a maximum, a branch circuit in parallel with the source of electromotive force and means for connecting said line-circuit and branch circuit whereby the line-circuit is short-circuited or grounded at moments of zero-potential difference between the line and return circuit, said zero-potential difference being approached gradually from the maximum value of the line potential.

12. The combination with a line-circuit and telegraphic receiving apparatus connected thereto of a source of electromotive force consisting of a plurality of elements of sustained electromotive force, means for connecting one terminal of said circuit to one of the elements of said source and for connecting the other terminal of said circuit so as to include a periodically increasing and decreasing number of said elements to produce periodic impulses of electromotive force, and means for transmitting code-determined current impulses to said receiving apparatus.

13. A system of telegraphy comprising in combination an electric circuit, a source of sustained direct electromotive force, means for deriving therefrom one or more series of rising and falling impulses of electromotive force, and a perforated tape traveling between circuit-closing terminals and adapted to impress upon the circuit code-determined electromotive-force impulses so as to transmit corresponding current impulses over said circuit to suitable receiving apparatus.

14. The combination with an electric circuit, of a plurality of sources of sustained direct electromotive force, means for connecting in circuit without reversal a periodically increasing and decreasing number of said sources to produce one or more series of periodic impulses of electromotive force, the impulses in each series being all of one polarity, and a perforated tape traveling between circuit-closing terminals and adapted to transmit code-determined current impulses over said circuit to suitable receiving apparatus.

15. In a telegraph system, the combination with a line-circuit and telegraphic receiver connected thereto, of a series of contact-plates of successively greater and lesser potential, a connection between one of said contact-plates and one terminal of the line-circuit, means for connecting the other terminal of the line-circuit successively to said contact-plates so as to impress upon the line a periodically rising and falling potential, and a selective transmitter adapted to transmit over the circuit code-determined current impulses.

16. The combination with a telegraphic receiving apparatus, of a line-circuit connected thereto, a source of sustained electromotive force, means for deriving from said source a series of rising and falling impulses and a transmitter operating synchronously with the said impulses to apply said impulses to the circuit according to a code.

17. The combination with a telegraphic receiver of a line-circuit connected thereto, two sources of sustained electromotive force of opposite polarity, means for deriving from said sources two series of impulses with simultaneous zero and maximum points and a selective transmitter for applying the said impulses to the line according to a code.

In witness whereof I have hereunto set my hand, before two subscribing witnesses, this 19th day of October, 1899.

FREDERICK BEDELL.

Witnesses:
L. T. SHAW,
G. W. HOPKINS.